(12) United States Patent
Darrington et al.

(10) Patent No.: US 7,512,836 B2
(45) Date of Patent: Mar. 31, 2009

(54) FAST BACKUP OF COMPUTE NODES IN FAILING MIDPLANE BY COPYING TO NODES IN BACKUP MIDPLANE VIA LINK CHIPS OPERATING IN PASS THROUGH AND NORMAL MODES IN MASSIVELY PARALLEL COMPUTING SYSTEM

(75) Inventors: David L. Darrington, Rochester, MN (US); Patrick Joseph McCarthy, Rochester, MN (US); Amanda Peters, Rochester, MN (US); Albert Sidelnik, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 11/608,891

(22) Filed: Dec. 11, 2006

(65) Prior Publication Data
US 2008/0140735 A1 Jun. 12, 2008

(51) Int. Cl.
*G06F 11/20* (2006.01)
(52) U.S. Cl. .............................. 714/13; 712/32; 714/7
(58) Field of Classification Search ...................... None
See application file for complete search history.

(56) References Cited

U.S. PATENT DOCUMENTS

| | | | |
|---|---|---|---|
| 4,581,701 A | * | 4/1986 | Hess et al. ................... 700/82 |
| 5,689,646 A | | 11/1997 | Thorson |
| 2004/0078647 A1 | * | 4/2004 | Das Sharma et al. ........... 714/7 |
| 2004/0103218 A1 | * | 5/2004 | Blumrich et al. ............ 709/249 |
| 2004/0153754 A1 | | 8/2004 | Chen et al. |

FOREIGN PATENT DOCUMENTS

| | | | |
|---|---|---|---|
| JP | WO 2004/079573 | * | 9/2004 |
| WO | WO 2005106668 A | | 11/2005 |

OTHER PUBLICATIONS

Gara, A. et al: "Overview of the Blue Gene/L System Architecture", IBM Journal of Research and Development, vol. 49, No. 2/3, Mar. 1, 2005, pp. 195-212.

* cited by examiner

*Primary Examiner*—Kenneth S Kim
(74) *Attorney, Agent, or Firm*—Martin & Associates, LLC (57) ABSTRACT

A method and apparatus for fast backup of a set of compute nodes to save the state of the software in a parallel computer system. A fast backup mechanism in the service node of the computer system configures a set of nodes to be used for a backup and when needed uses the network hardware to perform a fast backup from node to node from an original set of nodes to the backup set of nodes. In the preferred embodiments a the fast backup is done with respect to a midplane or rack of nodes copied to a backup rack of nodes.

16 Claims, 8 Drawing Sheets

FAST BACKUP OF COMPUTE NODES IN FAILING MIDPLANE BY COPYING TO NODES IN BACKUP MIDPLANE VIA LINK CHIPS OPERATING IN PASS THROUGH AND NORMAL MODES IN MASSIVELY PARALLEL COMPUTING SYSTEM

BACKGROUND OF THE INVENTION

1. Technical Field

This invention generally relates to backing up and fault recovery in a computing system, and more specifically relates to an apparatus for fast backup of compute nodes in a massively parallel super computer.

2. Background Art

Efficient fault recovery is important to decrease down time and repair costs for sophisticated computer systems. On parallel computer systems with a large number of compute nodes, a failure of a single component may cause a large portion of the computer to be taken off line for repair.

Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

The Blue Gene/L supercomputer communicates over several communication networks. The 65,536 computational nodes are arranged into both a logical tree network and a 3-dimensional torus network. The logical tree network connects the computational nodes in a tree structure so that each node communicates with a parent and one or two children. The torus network logically connects the compute nodes in a three-dimensional lattice like structure that allows each compute node to communicate with its closest 6 neighbors in a section of the computer. Since the compute nodes are arranged in a torus and tree network that require communication with adjacent nodes, a hardware failure of a single node can bring a large portion of the system to a standstill until the faulty hardware can be repaired. For example, a single node failure could render inoperable a complete section of the torus network, where a section of the torus network in the Blue Gene/L system is a half a rack or 512 nodes. Further, all the hardware assigned to the partition of the failure may also need to be taken off line until the failure is corrected.

On large parallel computer systems in the prior art, a failure of a single node during execution often requires that the data of an entire partition of the computer be saved to external file system so the partition can be taken off line. The data must then be reloaded to a backup partition for the job to resume. When a failure event occurs, it is advantageous to be able to save the data of the software application quickly so that the application can resume on the backup hardware with minimal delay to increase the overall system efficiency. Without a way to more effectively save the software state and data, parallel computer systems will continue to waste potential computer processing time and increase operating and maintenance costs.

DISCLOSURE OF INVENTION

According to the preferred embodiments, a method is described for a fast backup of a set of compute nodes to save the state of the software in a parallel computer system. A fast backup mechanism in the service node of the computer system configures a set of nodes to be used for a backup and when needed uses the network hardware to perform a fast backup from node to node from an original set of nodes to the backup set of nodes. The fast backup mechanism takes advantage of the high speed data transfer capability of the torus network to copy from node to node all the node data for the job executing on the node. In the preferred embodiments the fast backup is done with respect to a midplane or rack of nodes copied to a backup rack of nodes.

The disclosed embodiments are directed to the Blue Gene architecture but can be implemented on any parallel computer system with multiple processors arranged in a network structure. The preferred embodiments are particularly advantageous for massively parallel computer systems.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to an apparatus and method for fast backup of compute nodes in a highly interconnected computer system such as a massively parallel super computer system. When a rack of nodes has a failure, the application software is suspended while the data on all the nodes is copied to a backup rack and the torus network is rerouted to include the backup rack in place of the failing rack. The preferred embodiments will be described with respect to the Blue Gene/L massively parallel computer being developed by International Business Machines Corporation (IBM).

Figure 1:
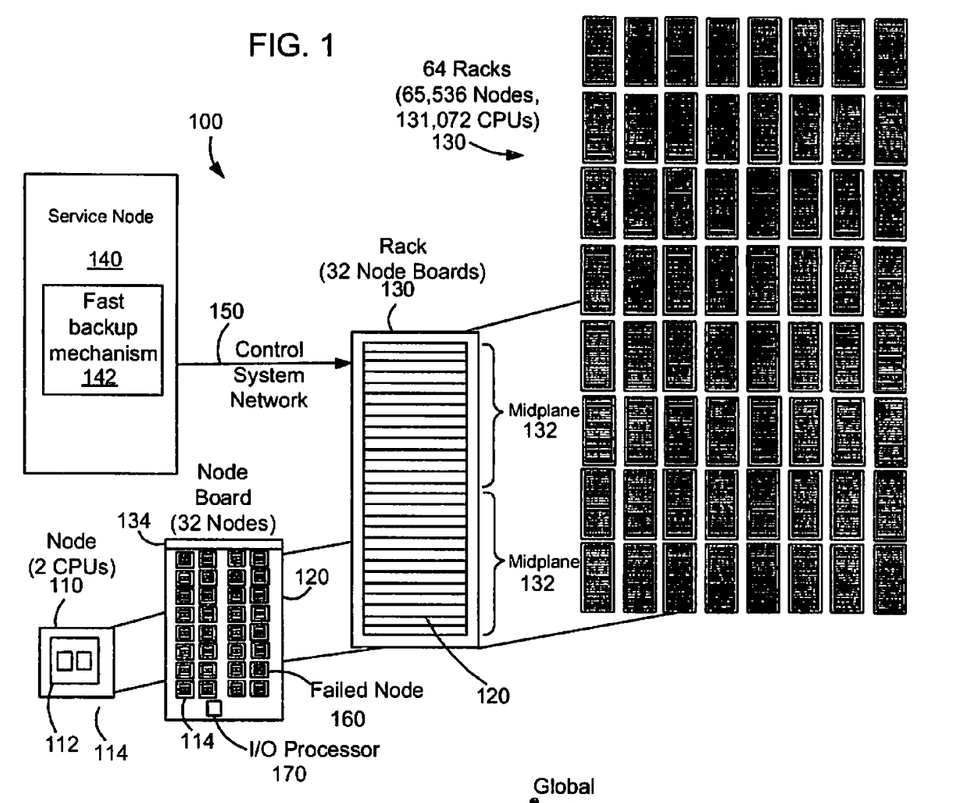
FIG. 1 is a block diagram of a massively parallel computer system according to preferred embodiments.

FIG. 1 shows a block diagram that represents a massively parallel computer system 100 such as the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a 10 housing that contains 32 node boards 120. Each of the node boards 120 connect into a midplane printed circuit board with a midplane connector 134. The midplane printed circuit board is inside the rack and not shown in FIG. 1. The midplane 132 icludes the midplane printed circuit board and all the node boards with their nodes connected to the midplane printed circuit board and link cards as described below.The full Blue Gene/L computer system would be housed in 64 racks 130 or cabinets with 32 node boards 120 in each. The full system would then have 65,536 nodes and 131,072 CPUs (64 racks× 32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit ethernet network (not shown). The gigabit Ethernet network is connected to an I/O processor (or Blue Gene/L link chip) 170 located on a node board 120 that handles communication from the service node 160 to a number of nodes. The Blue Gene/L system has one or more I/O processors 170 on an I/O board (not shown) connected to the node board 120. The I/O processors can be configured to communicate with 8, 32 or 64 nodes. The service node is uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node. In addition, the service node 140 includes a fast backup mechanism 142. The fast backup mechanism comprises software in the service node 140 that operates to copy from one midplane to another according to preferred embodiments claimed herein.

Figure 2:
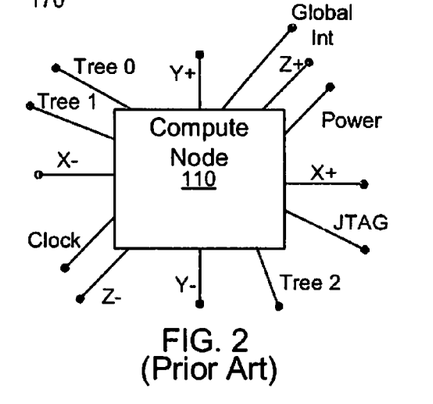
FIG. 2 is a block diagram of a compute node for in a massively parallel computer system according to the prior art.

The Blue Gene/L supercomputer communicates over several communication networks. FIG. 2 shows a block diagram that shows the I/O connections of a compute node on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+ and Z− network connections that connect the node to six respective adjacent nodes. The tree network is represented in FIG. 2 by the tree0, tree1 and tree2 connections. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

Figure 3:
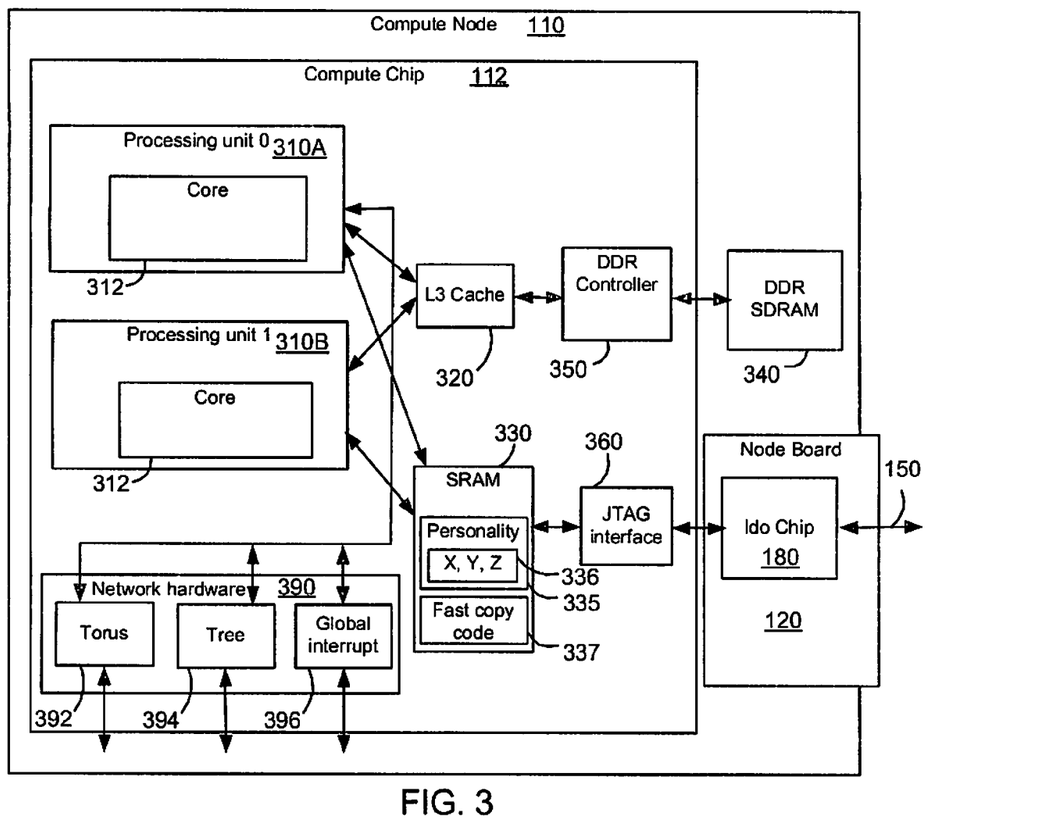
FIG. 3 is a block diagram of a midplane in a massively parallel computer system according to the prior art.

FIG. 3 illustrates a block diagram of a compute node 110 in the Blue Gene/L computer system according to the prior art. The compute node 110 has a node compute chip 112 that has two processing units 310A, 310B. Each processing unit 310, has a processing core 312. The processing units 310 are connected to a level three memory cache (L3 cache) 320, and to a static random access memory (SRAM) memory bank 330. Data from the L3 cache 320 is loaded to a bank of dual data rate (DDR) synchronous dynamic random access memory (SDRAM) 340 by means of a DDR memory controller 350.

Again referring to FIG. 3, the SRAM memory 330 is connected to a JTAG interface 360 that communicates off the compute chip 112 to an Ido chip 180. The service node communicates with the compute node through the Ido chip 180 over the an ethernet link that is part of the control system network 150 (described above with reference to FIG. 1). In the Blue Gene/L system there is one Ido chip per node board 120, and others on boards in each midplane 132 (FIG. 1). The Ido chips receive commands from the service node using raw UDP packets over a trusted private 100 Mbit/s Ethernet control network. The Ido chips support a variety of serial protocols for communication with the compute nodes. The JTAG protocol is used for reading and writing from the service node 140 (FIG. 1) to any address of the SRAMs 330 in the compute nodes 110 and is used for the system initialization and booting process.

As illustrated in FIG. 3, the SRAM 330 includes a personality 335. During the boot process, the service node stores information that is specific to an individual node in the personality. The personality includes the X, Y, Z coordinates 336 for the local node as assigned by the service node. When the node is initialized, initialization software uses the X, Y, Z coordinates 336 in the personality 335 to configure this node to the coordinates as assigned. The service node can change the X, Y, Z coordinates and direct the node to change its assigned coordinates. This prior art feature is used by the fast backup mechanism as described further below.

Again referring to FIG. 3, in preferred embodiments, the SRAM 330 further includes fast copy code 337. The fast copy code 337 is used to copy the contents of the node's SDRAM memory 340 during the backup as directed by the fast backup mechanism 142 (FIG. 1) in the service node. In the prior art, copying from node to node over the torus network was typically done with code executing from the DDR SDRAM 340. Further, in the prior art approach to node backup, the original node would copy the contents of memory to an external device (file in the file system) and the target node would read it from the file system. In contrast, the fast copy code in the SRAM 330 supports copying the contents of the entire DDR SDRAM 340 from an original midplane to a backup midplane over the torus network without writing the contents to an external file. Utilizing the torus network for backup is much faster than coping to a file. Also, the prior procedure to write to a file needed to execute out of DDR memory because it was a much larger procedure that would not fit in SRAM. In contrast, the fast copy code can be a small amount of code since it does not involve file system access and therefore can be deployed in the smaller SRAM 330 memory.

During the backup process, the service node suspends all code execution from SDRAM 340 and directs the fast copy code 337 to perform the fast copy of the SDRAM 340 memory to the backup node. On the receiving end of the fast copy, the backup node may also use the fast copy code 337 in the SRAM 330 in receiving of the backup data.

The node compute chip 112, illustrated in FIG. 3, further includes network hardware 390. The network hardware 390 includes hardware for the Torus 392, Tree 394 and Global interrupt 396 networks. These networks of the Blue Gene/L are used for a compute node 110 to communicate with the other nodes in the system as described briefly above. The network hardware 390 allows the compute node to receive and pass along data packets over the torus network. The network hardware 390 handles network data traffic independently so the compute node's processors are not burdened by the amount of data flowing on the torus network.

Figure 4:
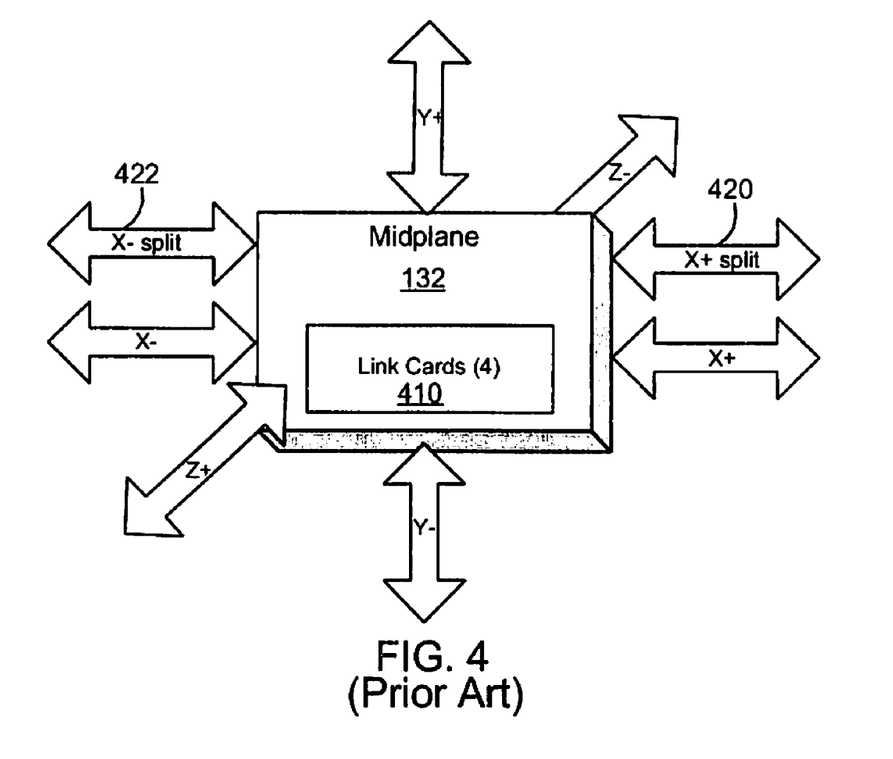
FIG. 4 is a block diagram of a midplane in a massively parallel computer system according to the prior art.

FIG. 4 illustrates a midplane 132 of the BG/L computer system. As stated above, each rack of nodes is divided into two midplanes. Each of the midplanes is connected to its six adjacent neighbors in the torus network as indicated by the arrows from each face of the midplane 132. Besides the 16 node cards, each with 32 BG/L compute nodes, each midplane contains four link cards 410 with six link chips 510 (shown in FIG. 5) on each link card for a total of 24 link chips per midplane. At the midplane boundaries, all the BG/L networks pass through a link chip. The link chip serves two functions. First, it re-drives signals over the cables between the midplanes, restoring the high-speed signal shape and amplitude in the middle of a long lossy trace-cable-trace connection between compute ASICs on different midplanes. Second, the link chip can redirect signals between its different ports. This redirection function allows BG/L to be partitioned into multiple logically separate systems.

Again referring to FIG. 4, each midplane communicates with its 6 neighboring midplanes on the torus network. The connections to the 6 neighboring midplanes are designated by their Cartesian coordinates with respect to the midplane and therefore lie in the X+, X-, Y+, Y-, Z+ and Z- directions as shown. In addition, there is an additional set of connections in the X axis called X split cables. The X split cables include an X+ split cable 420 and an X- split cable 422. The X split cables 420, 422 provide a way to enhance partition functionality by providing an additional route for connecting the torus network in the X dimension. When some midplanes are used as a backup as described herein, the X split cables can also be used to group backup midplanes or racks into a partition for use by other applications when the backup racks are not needed as a backup.

Figure 5:
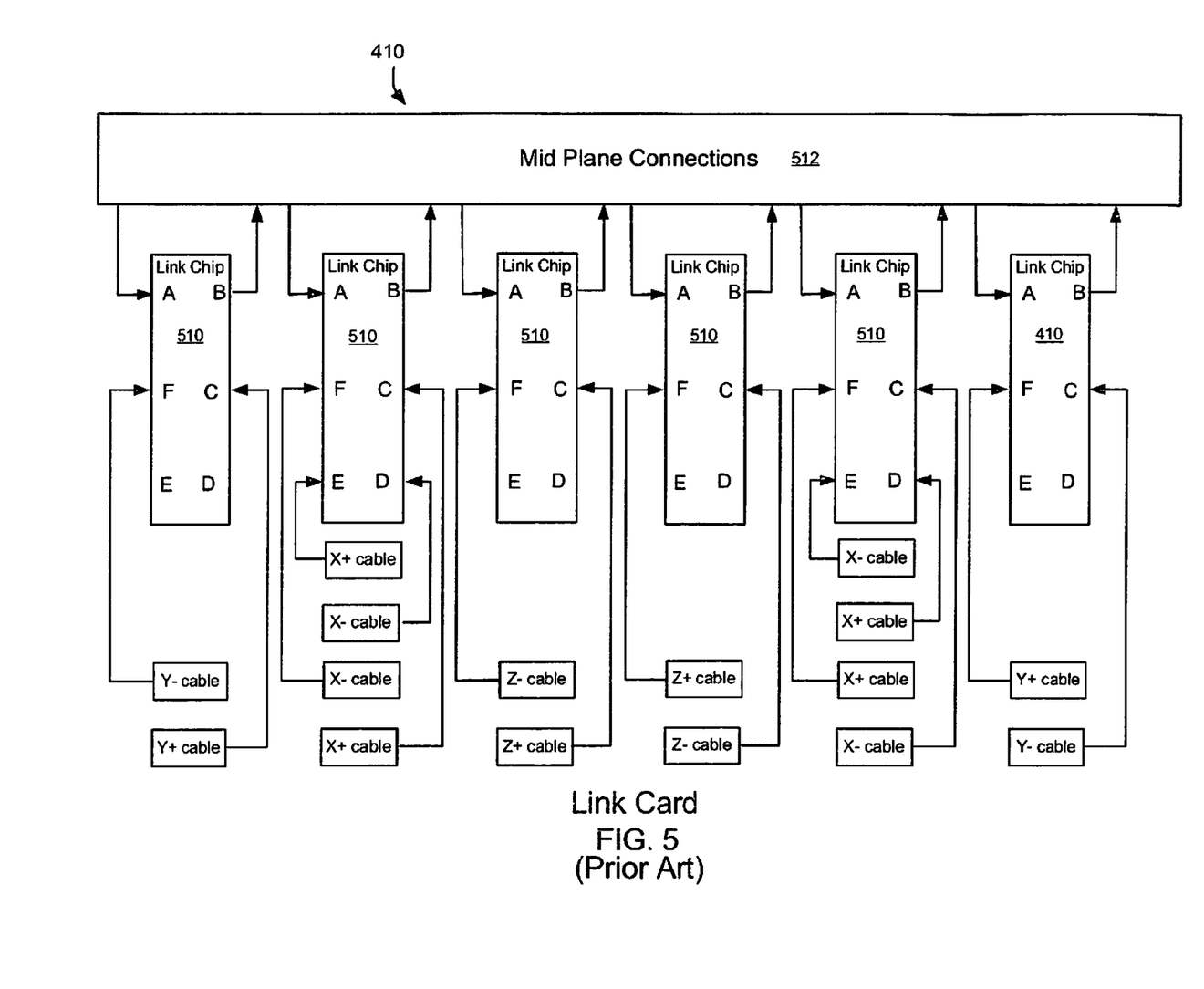
FIG. 5 is a block diagram of a link card in a massively parallel computer system according to the prior art.

FIG. 5 illustrates a block diagram of a link card 410 with six link chips 510. Each link chip 510 has six ports (A, B, C, D, E, and F). Ports A and B are connected directly to nodes in a midplane through midplane connections 512. The other four ports are connected to cables or are unused. In the BG/L system, the link card only has 16 cable connectors, each attached to a link chip driving or receiving port, therefore 8 ports of the link chips are unused. The logic inside the link chip supports arbitrary static routing of any port to any other port. This routing is set by the host at the time the partition is created and is static until another partition is created or reconfigured. The chip contains three send (B,C,D) and three receive ports (A,E,F); signals received at each input port can be routed to any of the output ports. The A and B ports are connected to the midplane. The F and C ports are connected to an cable in the X,Y or Z plane. The E and D ports that are used are connected to an X split cable (420, 422 in FIG. 4). Each link chip port supports 21 differential pairs (16 data signals, a sense signal to prevent an unpowered chip from being driven by driver outputs from the other end of the cable, a spare signal, a parity signal, and two asynchronous global interrupt signals).

The BG/L torus interconnect requires a node to be connected to its six nearest neighbors (X+, X-, Y+, Y-, Z+, Z-) in a logical 3D Cartesian array. The connections to the six neighbors is done at the node level, and at the midplane level. Each midplane is a 8×8×8 array of nodes. The six faces (X+, X-, Y+, Y-, Z+, Z-) of the node array in the midplane are each 8×8=64 nodes in size. Each torus network signal from the 64 nodes on each of the six faces is communicated through the link chips to the corresponding nodes in adjacent midplanes. The signals of each face may also be routed back to the inputs of the same midplane on the opposite face when the midplane is used in a partition with a depth of one midplane in any dimension. Each link chip port serves 16 unidirectional torus links entering and exiting the midplane using the data signals of the 21 pairs through each port. Each midplane is served by 24 link chips with two ports of each link chip with 16 data signals on each port. Thus the six faces with 64 nodes requires 384 input and 384 output data signals supplied by 2 ports on the 24 link chips with each port supporting 16 data signals (16×24=384 for input and 384 for output).

Figure 6:
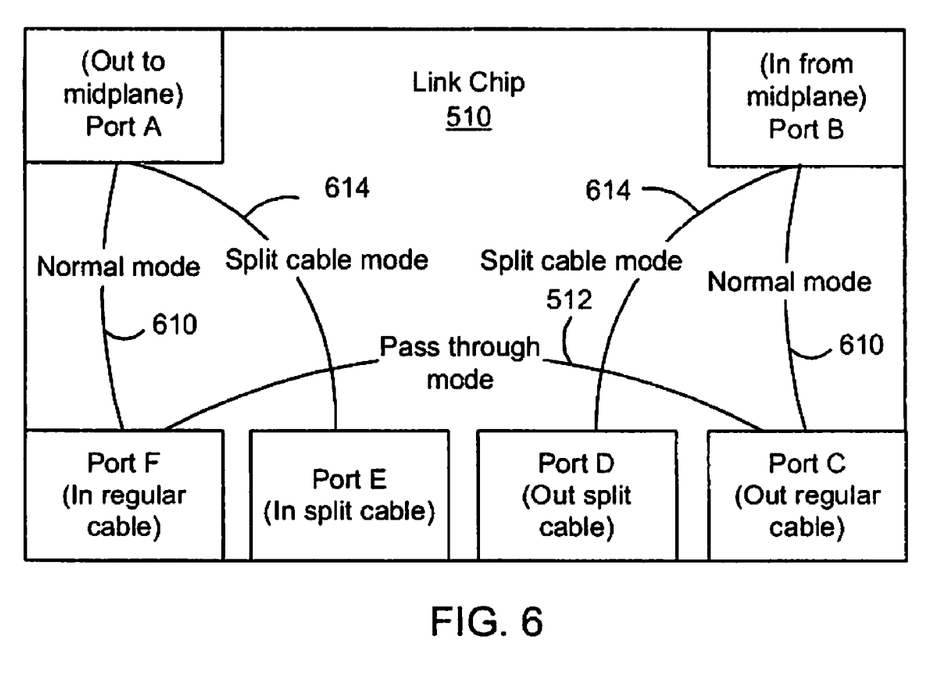
FIG. 6 is a block diagram that shows the different modes of operation of a link chip in a massively parallel computer system according to the prior art.

FIG. 6 illustrates the different modes of operation for the link chip 510 introduced above. When the link chip 510 is in the normal mode 610, the link chip 510 connects Port A to Port F and Port B to Port C. The normal mode 610 connects the midplane to the regular cables in the X, Y and Z dimensions. When the link chip 510 is connected in pass through mode 612, Port C is connected to Port F to bypass the midplane and send all signals to the next midplane in the torus network. In the Blue Gene/L system there are split cables connected in the X dimensions as introduced above. In split cable mode 614, Port A is connected to Port E and Port B is connected to Port D to connect the midplane to the X split cables.

Figure 7:
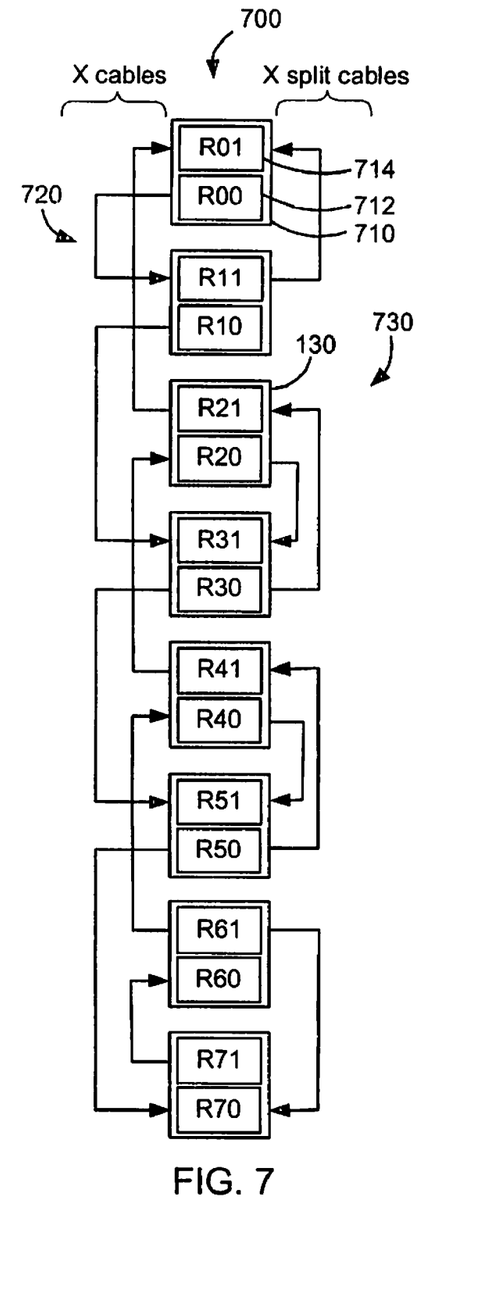
FIG. 7 is a block diagram representing a partition of a highly interconnected computer system such as a massively parallel computer system to illustrate an example according to preferred embodiments.

FIG. 7 illustrates a set 700 of racks 130 of a massively parallel computer system such as the Blue Gene/L computer system that are arranged into a partition in the X dimension. Each midplane 132 in each rack 130 is an 8×8×8 torus, where the coordinates of the torus are X, Y, and Z. Each rack is arranged in a 8×8×16 torus since the two midplanes of each rack are arranged in the Z dimension. The first rack 710 is rack 0 and has two midplanes R00 712 and R01 714. The remaining racks are similarly numbered R10 through R71. In the illustrated partition, the X cables 720 connect the 8 racks in the X dimension and the Y and Z dimensions are wrapped around in a single midplane. The X split cables 730 are shown on the right hand side of the drawing but are not used to configure the partition in this example. So the partition shown in FIG. 7 is a 128×8×8 torus. The X dimension cables 720 can be seen to connect the racks in the order of R0, R1, R3, R5, R7, R6, R4, R2 by following the direction of the X cables into a rack and then leaving the rack to the next rack. The coordinates of the nodes in the rack shown in FIG. 7 would then be assigned as shown in Table 1.

TABLE 1

| Rack | Node coordinates (X, Y, Z) |
|---|---|
| R0 | (0, 0, 0)-(7, 7, 16) |
| R1 | (8, 0, 0)-(15, 7, 16) |
| R2 | (56, 0, 0)-(63, 7, 16) |
| R3 | (16, 0, 0)-(23, 7, 16) |
| R4 | (48, 0, 0)-(55, 7, 16) |
| R5 | (24, 0, 0)-(31, 7, 16) |
| R6 | (40, 0, 0)-(47, 7, 16) |
| R7 | (32, 0, 0)-(39, 7, 16) |

Figure 8:
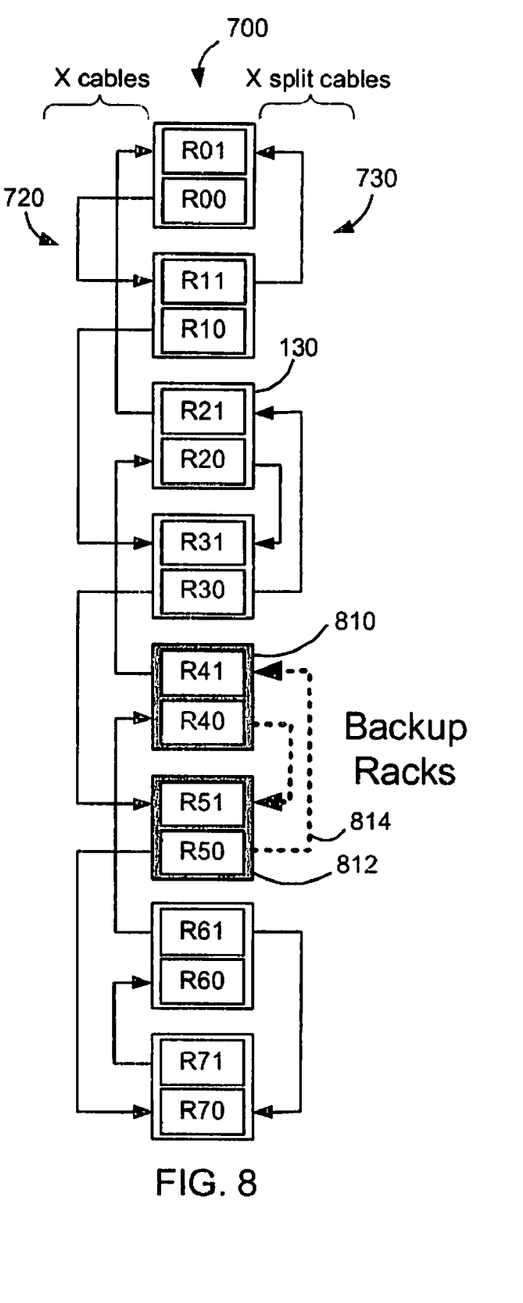
FIG. 8 is a block diagram of the partition shown in FIG. 7 configured with a set of backup racks.

FIG. 8 illustrates a set of racks 130 of a massively parallel computer system such as the Blue Gene/L computer system similar the set shown in FIG. 7, except now racks R4 810 and R5 812 are configured as a set of back up racks. The backup racks 810, 812 are configured to the pass through mode 612 shown in FIG. 6. The coordinates of the nodes in the rack shown in FIG. 8 would then be assigned as shown in Table 2.

TABLE 2

| Rack | Node coordinates (X, Y, Z) |
|---|---|
| R0 | (0, 0, 0)-(7, 7, 16) |
| R1 | (8, 0, 0)-(15, 7, 16) |
| R2 | (40, 0, 0)-(47, 7, 16) |
| R3 | (16, 0, 0)-(23, 7, 16) |
| R4 | Pass through mode |
| R5 | Pass through mode |
| R6 | (32, 0, 0)-(39, 7, 16) |
| R7 | (24, 0, 0)-(31, 7, 16) |

Again referring to FIG. 8, the backup racks 810, 812 can be configured as a separate partition to be used when the racks are not need as a backup. This can be done using the x split cables 814 shown in FIG. 8. The link chips in R4 810 and R5 812 are configured to be in pass through mode as discussed above, in addition these link chips are set in the split cable mode 614 as shown in FIG. 6 and discussed above. The coordinates of the nodes of racks R4 and R5 would then be assigned as shown in Table 3.

TABLE 3

| Rack | Node coordinates (X, Y, Z) |
|---|---|
| R0 | (0, 0, 0)-(7, 7, 16) |
| R1 | (8, 0, 0)-(15, 7, 16) |

When the copy mode is commenced as described further below, the backup racks 810, 812 are configured to the normal mode 610 shown in FIG. 6. The coordinates of the nodes in the rack shown in FIG. 8 are then assigned temporary coordinates that are not in the range of the original coordinates. The temporary coordinates allow the data in the original midplane to be copied into the backup midplane. An example of the temporary coordinates are shown in Table 4.

TABLE 4

| Rack | Node coordinates (X, Y, Z) |
|---|---|
| R0 | Pass through mode |
| R1 | Pass through mode |
| R2 | (0, 0, 0)-(7, 7, 16) |
| R3 | (24, 0, 0)-(31, 7, 16) |
| R4 | (8, 0, 0)-(15, 7, 16) |
| R5 | (16, 0, 0)-(23, 7, 16) |
| R6 | Pass through mode |
| R7 | Pass through mode |

When the copy mode is complete, the failed racks R2 and R3 are configured to the pass through mode 610 shown in FIG. 6 and the coordinates of the backup racks are then assigned the coordinates that were originally assigned to racks R2 and R3. Therefore, the backup racks now take the place of the original racks R2 and R3 as shown in Table 5.

TABLE 5

| Rack | Node coordinates (X, Y, Z) |
|---|---|
| R0 | (0, 0, 0)-(7, 7, 16) |
| R1 | (8, 0, 0)-(15, 7, 16) |
| R2 | Pass through mode |
| R3 | Pass through mode |
| R4 | (40, 0, 0)-(47, 7, 16) |
| R5 | (16, 0, 0)-(23, 7, 16) |
| R6 | (32, 0, 0)-(39, 7, 16) |
| R7 | (24, 0, 0)-(31, 7, 16) |

Figure 9:
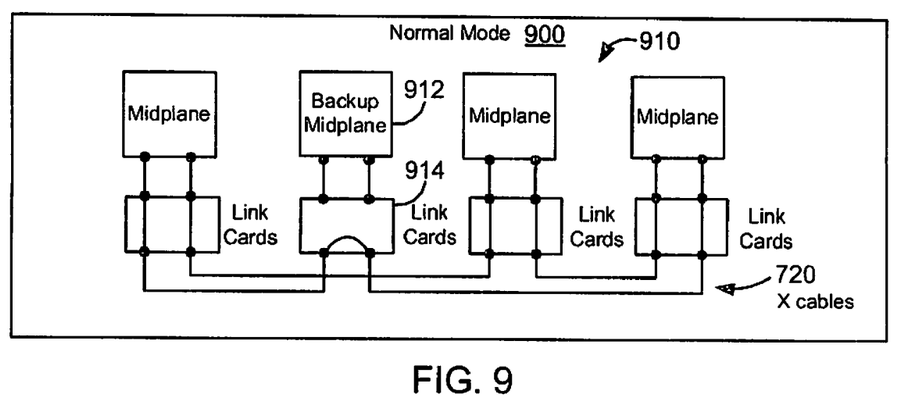
FIG. 9 is a highly simplified block diagram representing a partition operating in the normal mode.

An Example of a fast back up of compute nodes will now be described with reference to FIGS. 9 through 11. FIG. 9 illustrates a simplified representation of a set of midplanes similar to those shown in FIG. 8. FIG. 9 illustrates a normal mode of operation 900 for a partition 910 set up for fast backup. Four midplanes are shown connected in the X dimension with a single midplane 912 serving as a backup in the manner described above with reference to FIG. 8. The backup midplane 912 has its link cards 914 configured in the pass through mode 610 (FIG. 6). The normal mode of operation 900 is set up by the service node setting up the partition for backup operation by setting the backup rack or racks into the pass through mode as described above. Application jobs can then be scheduled on the partition until there is a need for a fast backup of the nodes in a midplane by copying the data in all the nodes to the backup midplane.

Figure 10:
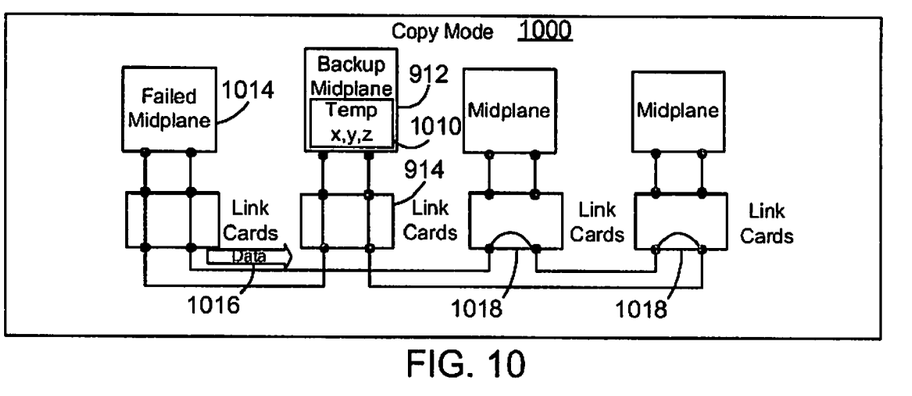
FIG. 10 is a block diagram representing the partition in FIG. 9 in the copy mode of operation.

FIG. 10 shows a block diagram that represents the partition 1010 of a massively parallel computer system shown in FIG. 9 during the copy mode 1000. When the service node detects a failure in a midplane during execution of a job, or for any other reason wants to backup a midplane, the fast backup mechanism 142 begins a fast backup of all the nodes on the midplane with the copy mode 1000. In copy mode 1000, the application or job running on the partition is suspended. The link card 914 for the backup midplane 912 is placed in the normal mode 610 (FIG. 6). The link cards 1018 for the other midplanes in the partition can be placed in the pass through mode to simplify the assigning of temporary coordinates. The midplane nodes are then assigned temporary coordinates that do not match the values of the midplanes in the original partition so that the nodes in the failed midplane 1012 can be copied into the backup midplane. The nodes in the failed midplane 1012 are then instructed to copy their contents to the respective nodes in the backup midplane using the temporary coordinates as shown by the data arrow 1014.

The nodes copy the entire contents of their memory to the corresponding node in the backup midplane in the manner known in the prior art. The copy can be accomplished by software running from the SRAM that receives the destination node from the fast backup mechanism. The node then sends the data over the torus network. The network hardware (390 FIG. 3) on each node receives data over the network and passes the data to the next node if the data is intended for a distant node. The data has a hop count that indicates how many positions in the torus to move. The hop count is decremented by each node and the last node accepts the data. After all the data in the nodes is copied, the partition can then be placed into the backup mode as shown in FIG. 11.

Figure 11:
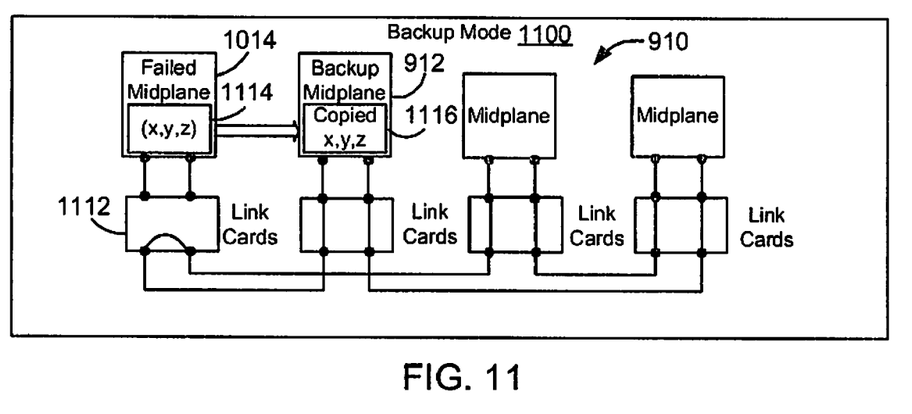
FIG. 11 is a block diagram representing the partition in FIG. 10 now in the backup mode of operation.

FIG. 11 shows a block diagram that represents the portion of a massively parallel computer system shown in FIG. 10 during the backup mode 1100. The partition is placed into the backup mode as shown in FIG. 11 by configuring the link cards 1112 of the failed midplane 1114 to the pass through mode 610 (FIG. 6). Further, the coordinates 1116 of the failed midplane 1114 are copied to the coordinates 1010 of the backup midplane 912. The job that was suspended on the partition 910 can now be resumed and continue processing without reloading or restarting the job.

Figure 12:
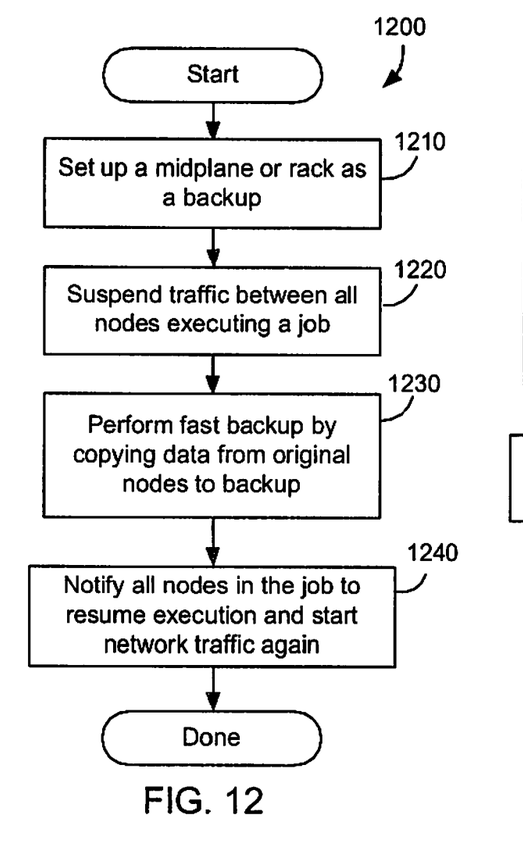
FIG. 12 is a method flow diagram for fast backup of compute nodes in a parallel computer system according to a preferred embodiment.

FIG. 12 shows a method 1200 for fast backup copying of nodes in a parallel computer system by the fast backup mechanism 142. The method operates to fast backup an original job operating on an original midplane to a backup midplane. First, setup a midplane or rack as a backup (step 1210). Next, suspend all traffic between all nodes executing a job (step 1220). Then perform a fast backup by copying data from nodes in an original midplane to corresponding nodes in a backup midplane (step 1230). Then notify all the nodes in the partition executing the job that they can resume the suspended job and start network traffic again (step 1240).

Figure 13:
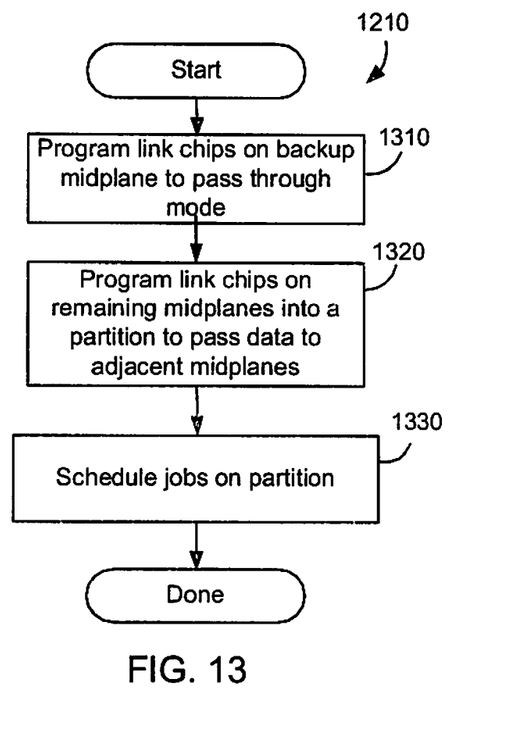
FIG. 13 is a method flow diagram that illustrates one possible method for implementing step 1210 of the method shown in FIG. 12.

FIG. 13 shows a method 1210 for setting up one or more midplanes as a backup and represents one possible implementation for step 1210 in FIG. 12. First, program the link chips on the backup midplane to the pass through mode (step 1310). Next, program the link chips on the remaining midplanes into a partition to pass node data to adjacent midplanes (step 1320). Then schedule a job or software application to execute on the partition (step 1330). The method is then done.

Figure 14:
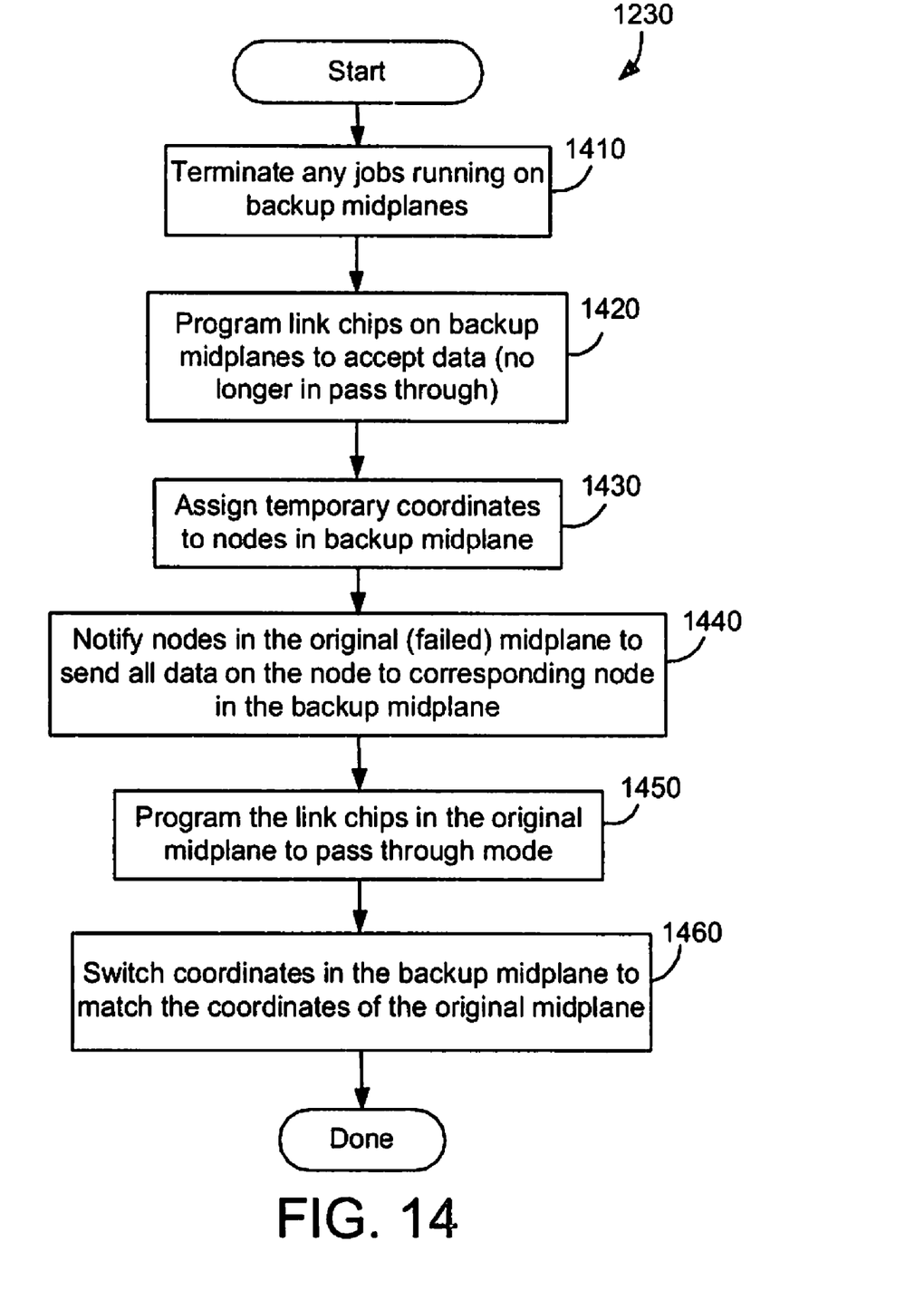
FIG. 14 is another method flow diagram that illustrates one possible method for implementing step 1230 of the method shown in FIG. 12.

FIG. 14 shows a method 1230 as one possible implementation for step 1230 in FIG. 12. Method 1230 illustrates performing a fast backup of compute nodes by copying all the node data in a parallel computer system from an original or failed midplane or rack of nodes to a backup midplane or rack of nodes. The method would be executed by the fast backup mechanism 142 on the service node 140. First, terminate any jobs running on the backup midplane if there are any (step 1410). Next, program the link chips on the backup midplane to the normal mode to accept data (step 1420). Then assign temporary coordinates to the nodes in the backup midplane (step 1430). Then notify all the nodes in the original or failed midplane to send all data on the node to the corresponding node in the backup midplane (step 1440). Next, program the link chips in the original midplane to the pass through mode (step 1450). Then switch the coordinates in the backup midplane to match the coordinates of the original midplane to configure the backup midplane to take the place of the original midplane (step 1460), and the method is then done.

As described above, embodiments provide a method and apparatus for fast backup of a set of nodes in a computer system such as a massively parallel super computer system. Embodiments herein can significantly decrease the amount of down time for increased efficiency of the computer system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A parallel computer system comprising:
a plurality of midplanes, each midplane comprising a plurality of interconnected compute nodes with node data and a plurality of link chips that connect the plurality of midplanes to a set of cables that interconnect the plurality of midplanes;
a fast backup mechanism in a service node of the computer system that sets up a midplane as a backup midplane by setting the plurality of link chips in the backup midplane to use a pass through mode that passes data coming to a first link chip in the backup midplane to a second link chip in an adjacent midplane; and
wherein the fast backup mechanism upon a failure with an original midplane instructs all the nodes in the original midplane to copy all their data to corresponding nodes in the backup midplane using a normal mode of the link chips with temporary coordinates for the corresponding nodes in the backup midplane.

2. The parallel computer system of claim 1 wherein the fast backup mechanism sets node coordinates in the backup midplane to a set of coordinates corresponding to the original midplane and puts the plurality of link chips in the original midplane into the pass through mode.

3. The parallel computer system of claim 1 wherein the compute nodes in the midplane are interconnected with a torus network to connect each node with its six nearest neighbors.

4. The parallel computer system of claim 3 further comprising cables to connect the midplanes to their six nearest neighbors.

5. The parallel computer system of claim 1 wherein the computer system is a massively parallel computer system.

6. The parallel computer system of claim 1 further comprising copy code in static random access memory (SRAM) to copy all the data in the compute nodes of the original midplane to corresponding nodes in the backup midplane.

7. A computer implemented method for fast backup of compute nodes in a parallel computer system where the method comprises the steps of:
setting up one of a plurality of midplanes as a backup midplane and one or more of the plurality of midplanes as a partition for executing a job, comprising the steps of:
1) programming a plurality of link chips on the backup midplane to use a pass through mode;

2) programming link chips on a plurality of remaining midplanes into a partition to pass node data to adjacent midplanes;
3) scheduling a job to execute on the partition;
suspending execution of nodes executing the job in the partition;
performing a fast backup by copying data from nodes in an original midplane in the partition to nodes in the backup midplane;
programming the plurality of link chips on the backup midplane to place the backup midplane into the partition using a normal mode; and notifying all nodes in the partition to resume execution.

8. The computer implemented method of claim 7 wherein the step of performing a fast backup further comprises the steps of:
programming the plurality of link chips on the backup midplane to the normal mode to accept data;
assigning temporary coordinates to the nodes in the backup midplane; and
notifying all the nodes in the original midplane to send all data on the node to the corresponding node in the backup midplane.

9. The computer implemented method of claim 8 further comprising the steps of:
programming the link chips in the original midplane to the pass through mode; and switching the coordinates in the backup midplane to match the coordinates of the original midplane to configure the backup midplane to take the place of the original midplane.

10. The computer implemented method of claim 8 further comprising the step of:
terminating any jobs running on the backup midplane if there are any.

11. The computer implemented method of claim 8 wherein the step of copying data from the original midplane to the backup midplane is accomplished with copy code located in SRAM of the compute nodes.

12. A computer-readable program product comprising:
a fast backup mechanism in a service node of the computer system that sets up a midplane as a backup midplane by setting a plurality of link chips in the backup midplane to use a pass through mode that passes data coming to a first link chip to a second link chip in an adjacent midplane and the fast backup mechanism upon a failure with an original midplane instructs all compute nodes in the original midplane to copy all their data to corresponding compute nodes in the backup midplane using a normal mode of the link chips with temporary coordinates for the corresponding nodes in the backup midplane; and
computer recordable media bearing the fast backup mechanism.

13. The program product of claim 12 wherein the fast backup mechanism sets node coordinates in the backup midplane to a set of coordinates corresponding to the original midplane and puts the plurality of link chips in the original midplane into the pass through mode.

14. The program product of claim 13 wherein the compute nodes in the midplane are interconnected with a torus network to connect each node with its six nearest neighbors.

15. The program product of claim 13 wherein the computer system is a massively parallel computer system.

16. The program product of claim 13 wherein the backup mechanism places copy code into SRAM in the compute nodes and the copy code copies all the data in the compute nodes in an original midplane to corresponding compute nodes in the backup midplane.

* * * * *